P. H. L. TIRANTY AND J. T. F. CONTI.
STAMPING APPARATUS.
APPLICATION FILED JUNE 21, 1919.
1,386,142.
Patented Aug. 2, 1921.
12 SHEETS—SHEET 1.
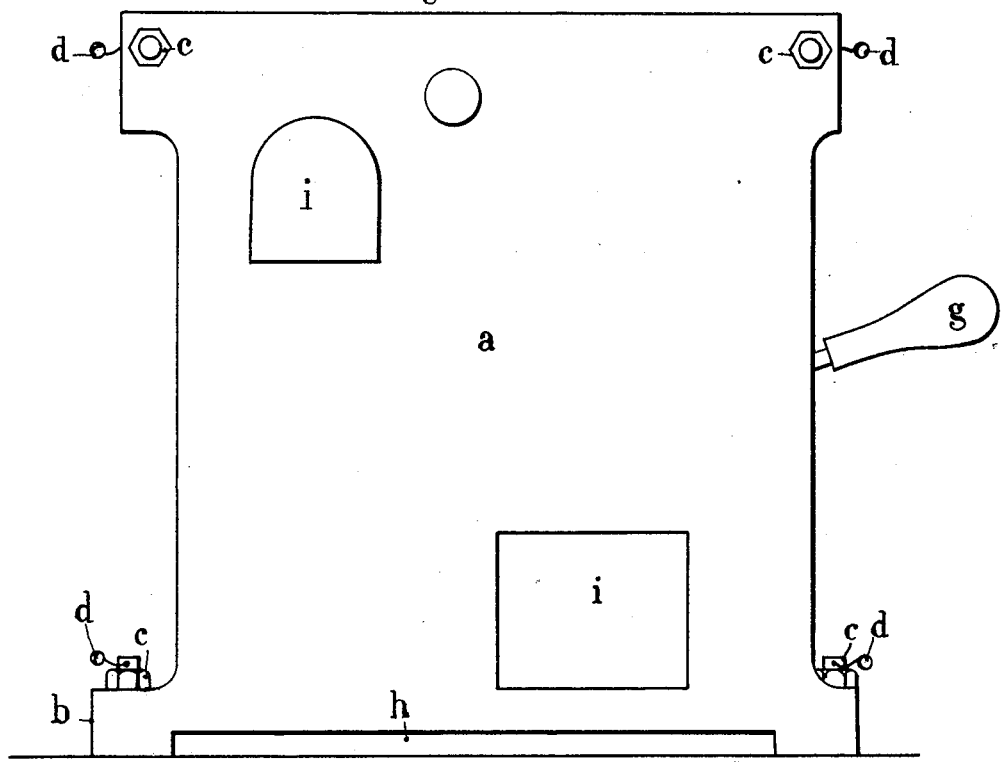
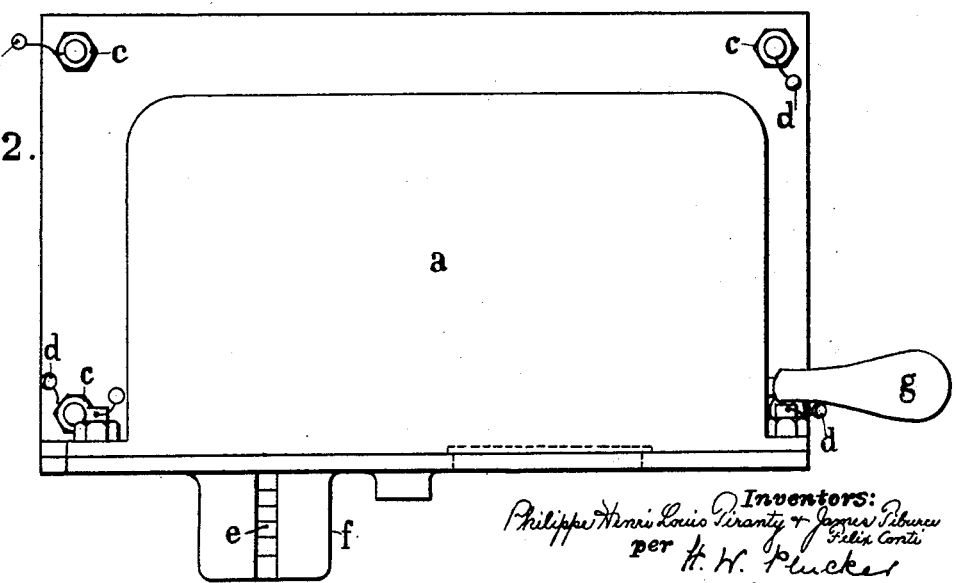

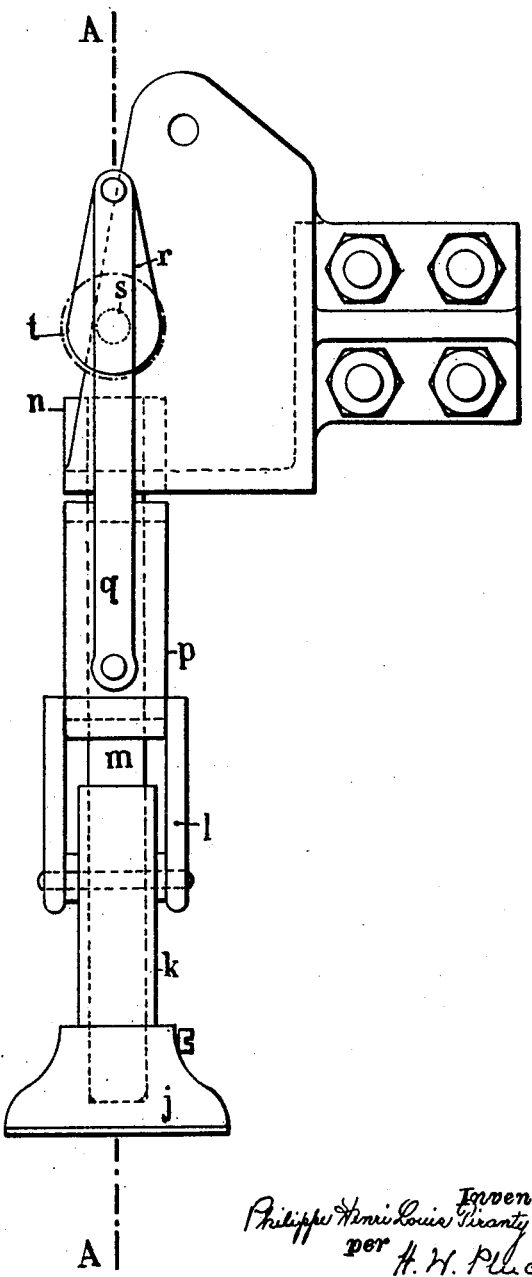

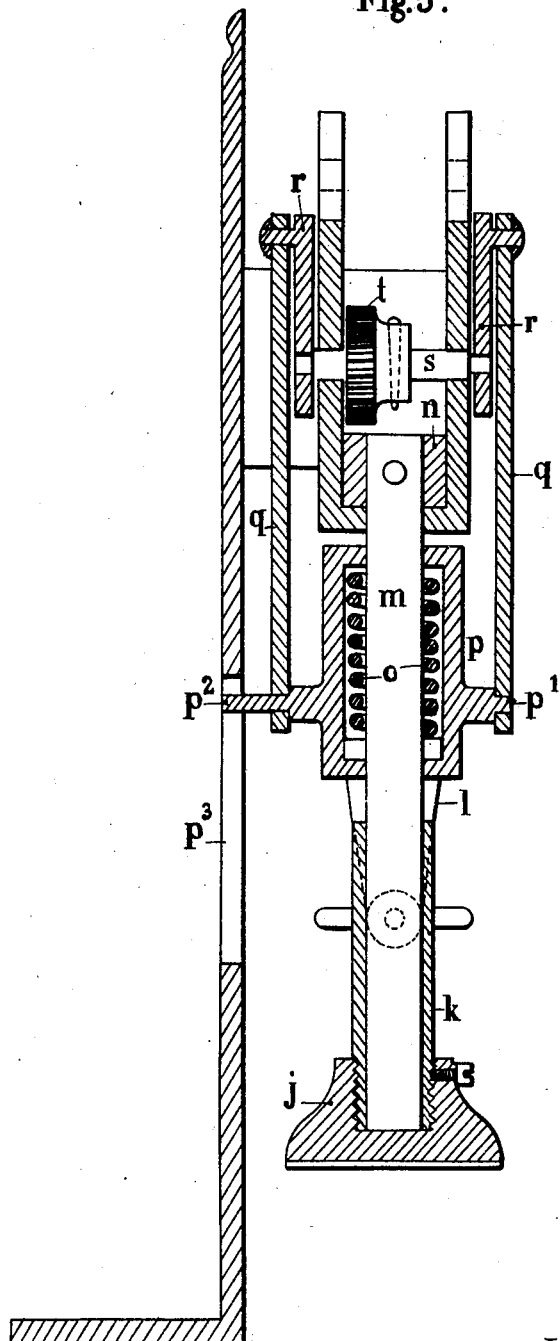

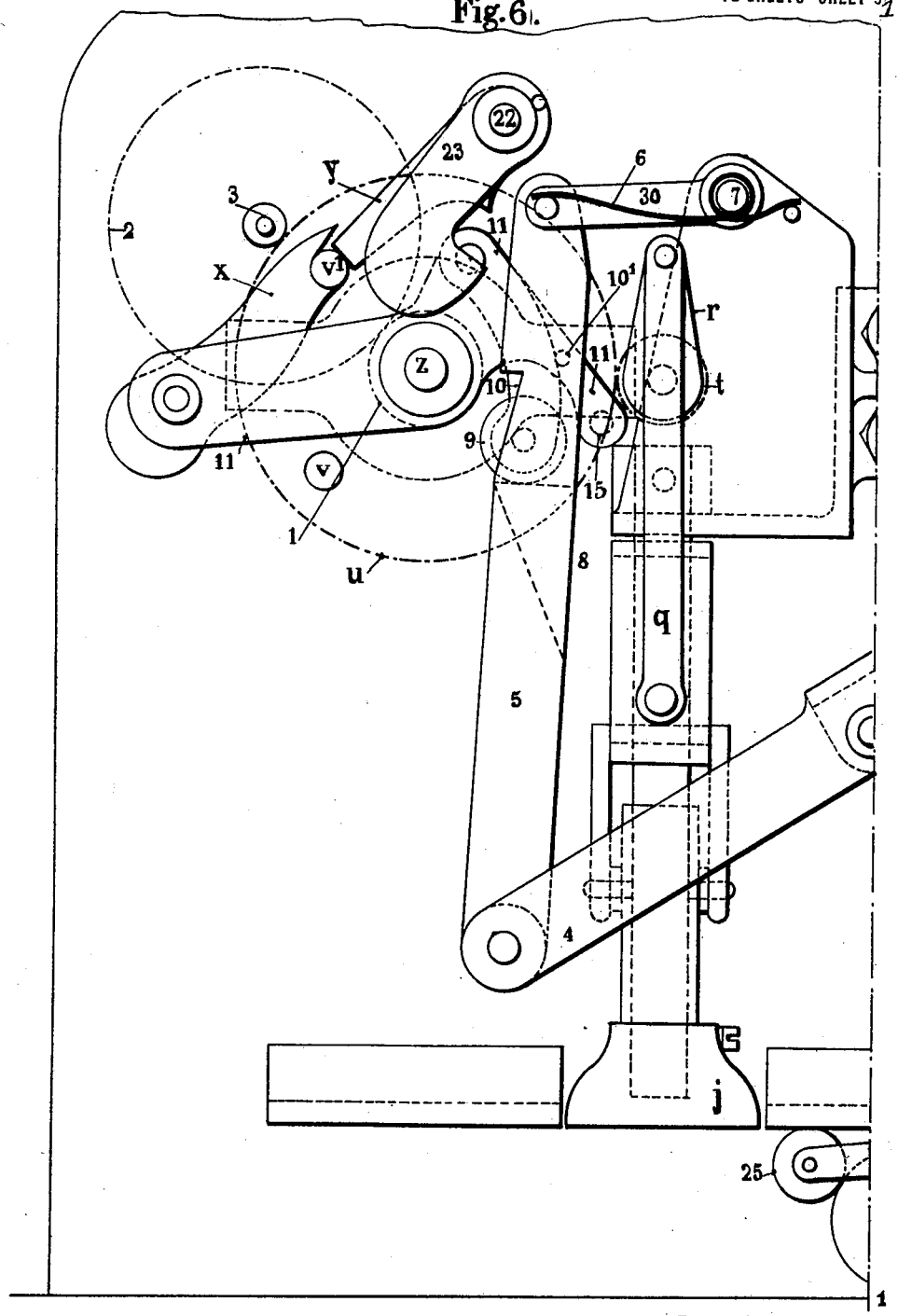

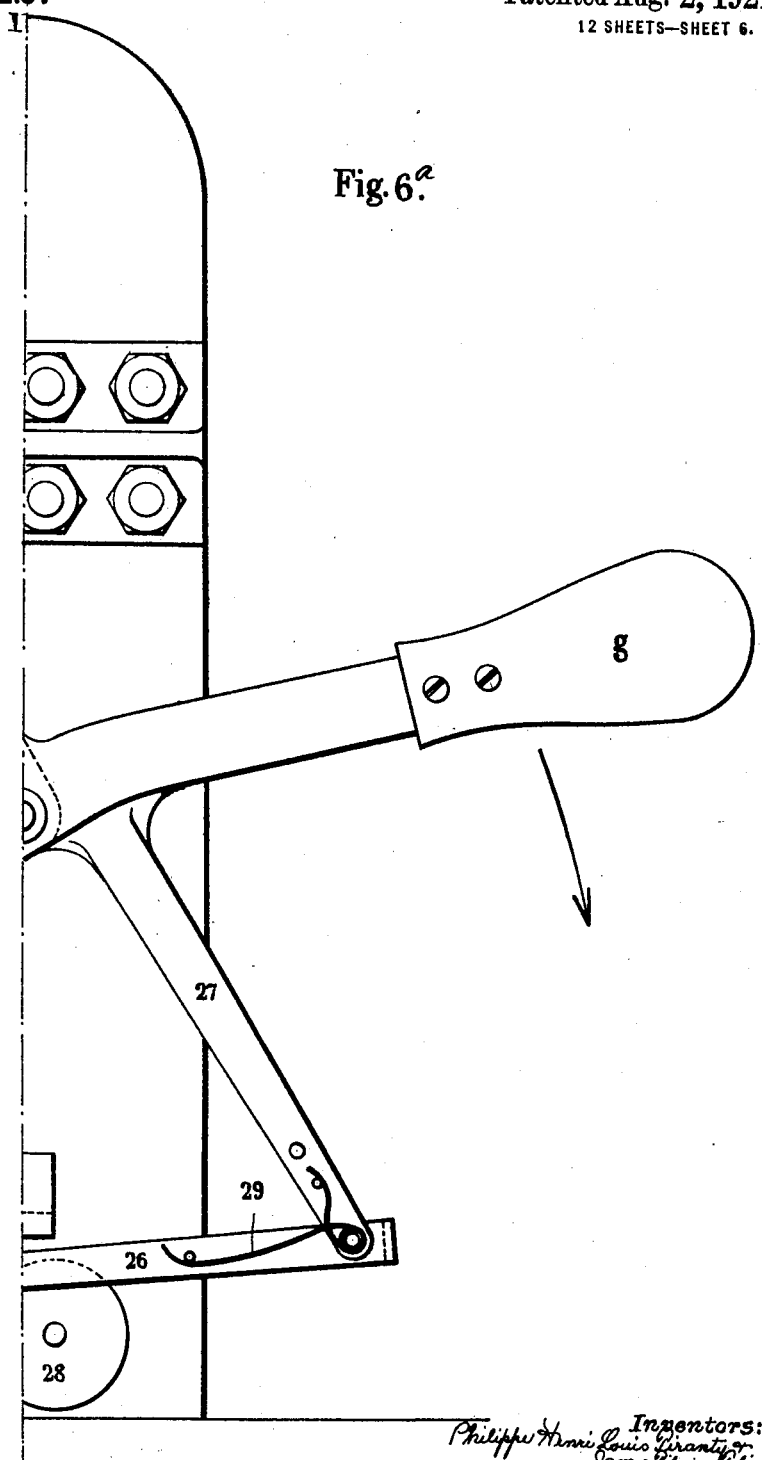

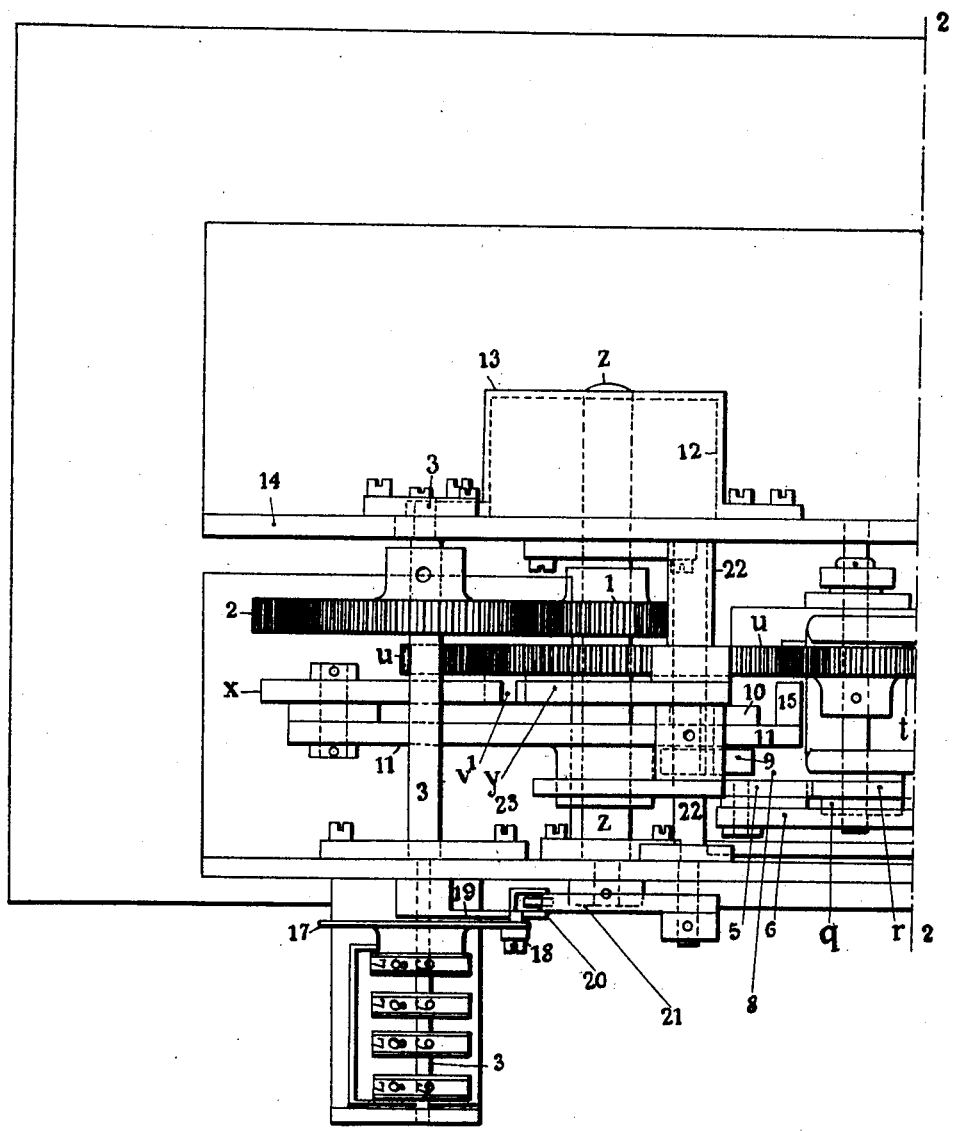

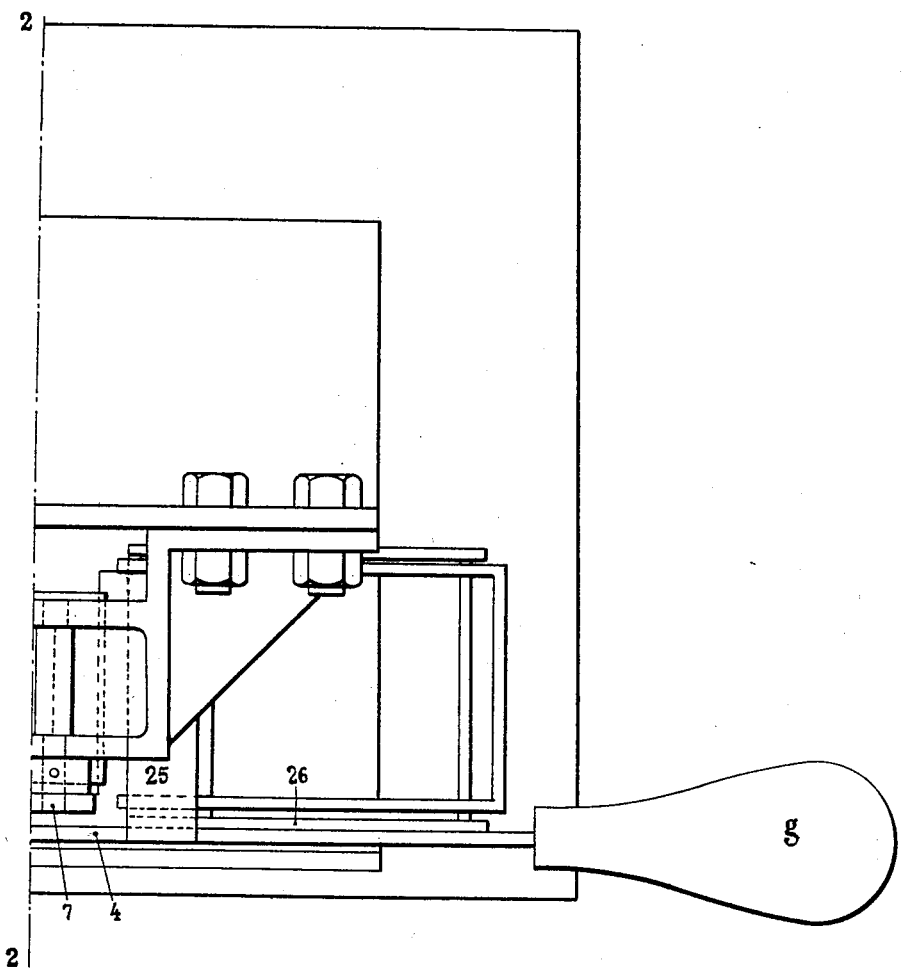

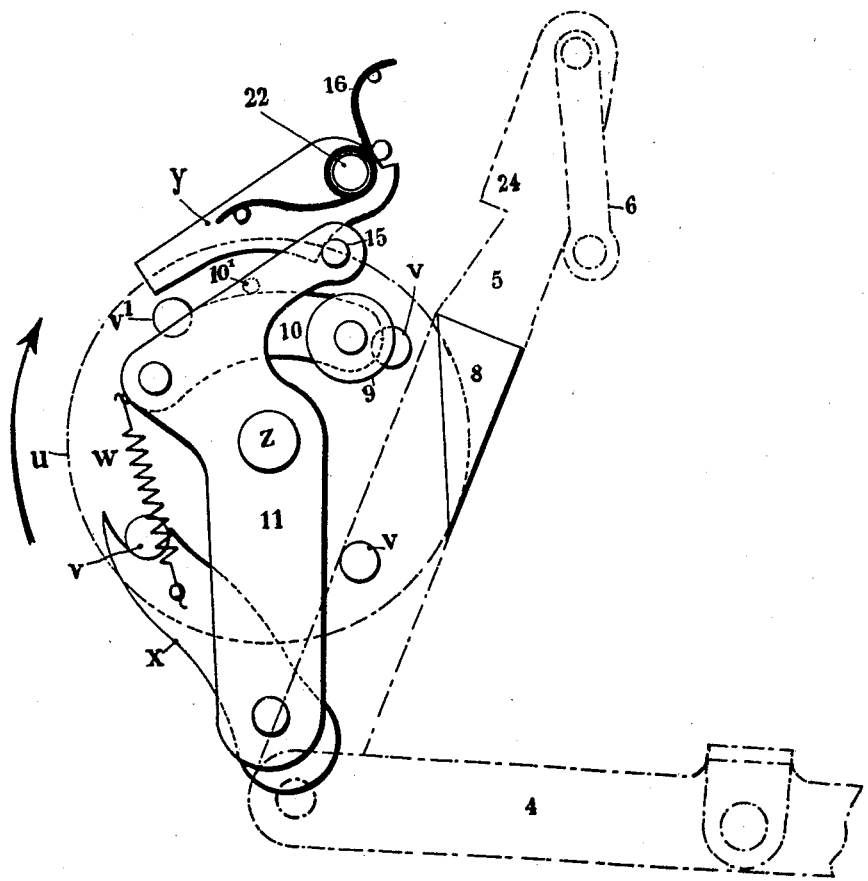

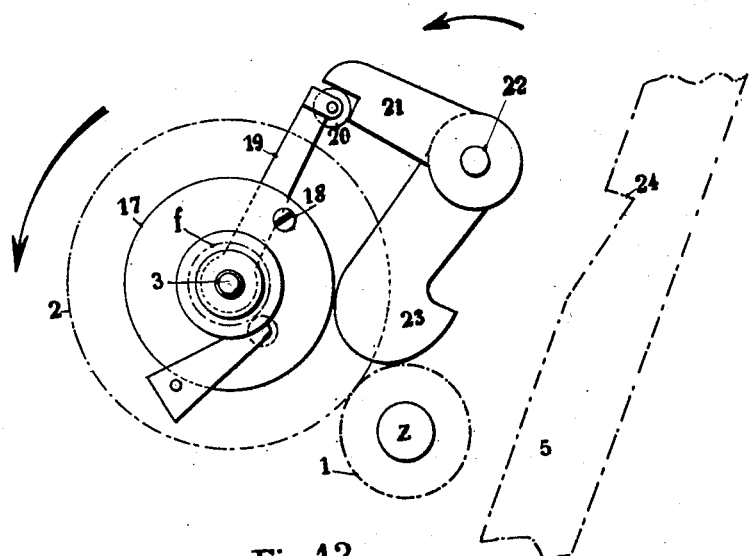
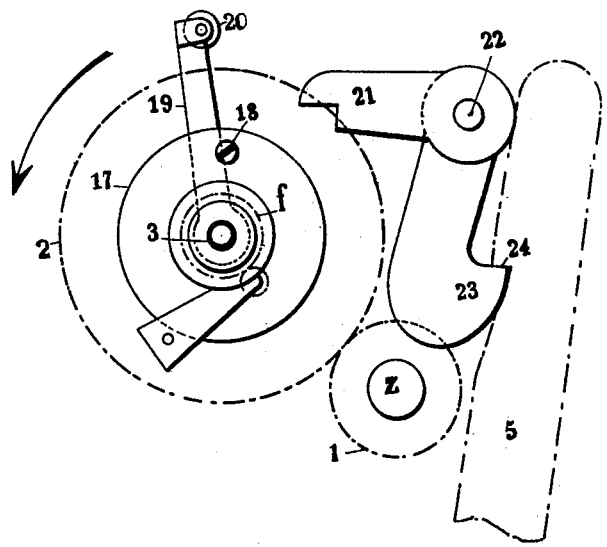

UNITED STATES PATENT OFFICE.

PHILIPPE HENRI LOUIS TIRANTY AND JAMES TIBURCE FELIX CONTI, OF PARIS, FRANCE.

STAMPING APPARATUS.

1,386,142.     Specification of Letters Patent.     Patented Aug. 2, 1921.

Application filed June 21, 1919. Serial No. 305,930.

*To all whom it may concern:*

Be it known that we, PHILIPPE HENRI LOUIS TIRANTY, of 103 Rue Lafayette, Paris, France, manufacturer, and JAMES TIBURCE FELIX CONTI, of 52 Rue de Clichy, Paris, France, engineer, citizens of the French Republic, have invented Improvements in or Relating to Stamping Apparatus, of which the following is a clear, full, and exact description.

The present invention relates to stamping apparatus, with a checking and recording device.

The object of this apparatus is to record a predetermined number of stampings, at the same time preventing a greater number from being effected than the number determined in advance. It is also for the purpose of preventing fraud as regards the number of operations actually effected.

This apparatus is characterized by the following points and the combination thereof:

1. A moistened or an inked stamp, controlled in a special manner;

2. A device for setting in motion the driven means of the stamp, under the action of a spring cocked and liberated by an operating handle;

3. A device for actuating a counter, with automatic locking of the apparatus when the counter marks its maximum figure, which is not to be exceeded.

This apparatus is suitable for a very large number of purposes. In point of fact, certain facsimile signatures have to be stamped on important documents, and it is indispensable to be able to be certain that no abusive use has been made of a seal that has had to be intrusted to third parties for the purpose of effecting a number of stampings, which can be checked. This necessity is met with in government offices and in banks, and, in general, in the majority of large commercial or industrial enterprises.

Independently of these applications, this apparatus may render great services to the state. In fact this apparatus, after being suitably sealed, could be intrusted to private individuals to enable them to utilize it for the purpose of stamping their own letters. The state would thus economize stamps and in addition it would reap an advantage arising from the number of stampings paid for in advance and not effected for some reason or other.

The apparatus would be sealed with the possibility of effecting 1000 or 10000 stampings, for example, paid for in advance, and when this number was reached an automatic locking would entirely prevent it from working. It would then be necessary to submit the apparatus to the authorities who would unseal it, and, by an extremely simple operation put it again into condition to supply a fresh set of stamping equal to the first.

Similarly, in post offices, this apparatus could be utilized by the public for stamping their letters themselves, for all that would be necessary for this application would be to attach to it a locking member that would be liberated by putting into the apparatus coins corresponding to the price of the stamp, by one of the numerous processes employed in automatic distributers.

This apparatus will also be of use to stamping authorities, and the ministerial officials could themselves effect the stamping of their writs or deeds by means of apparatus checked by the state, which would simply have to levy the sums shown by the counters carried by each piece of apparatus.

The same might apply as regards receipt stamps.

It follows from the above that the apparatus should fulfil the following conditions:—

1. It should be inviolable;

2. It should make it absolutely impossible for the operator to effect a stamping without the latter being recorded by the counter;

3. It should render it absolutely impossible for a single stamping to be effected in excess of the number of stampings fixed in advance by the constructor;

4. It should permit of the apparatus, after unsealing being put by a simple operation into a condition to effect a further series of stampings equal to the first.

By way of example, this invention will now be described hereunder in reference to the accompanying drawing, in which:—

Figure 1 shows the apparatus in question in front elevation;

Fig. 2 is a plan thereof;

Fig. 4 is a side view of the die or stamp detached;

Fig. 5 is a sectional elevation on the line A—A in Fig. 4;

Figure 8:
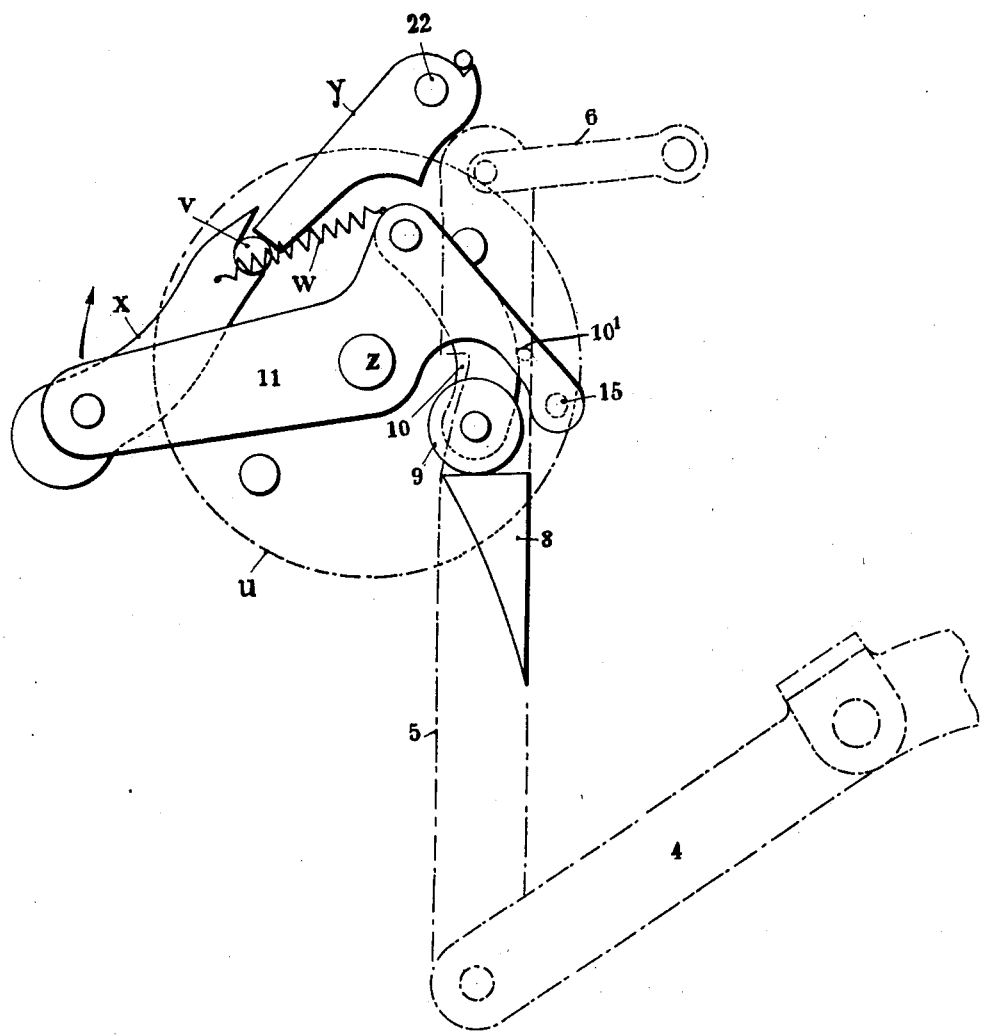
Figure 9:
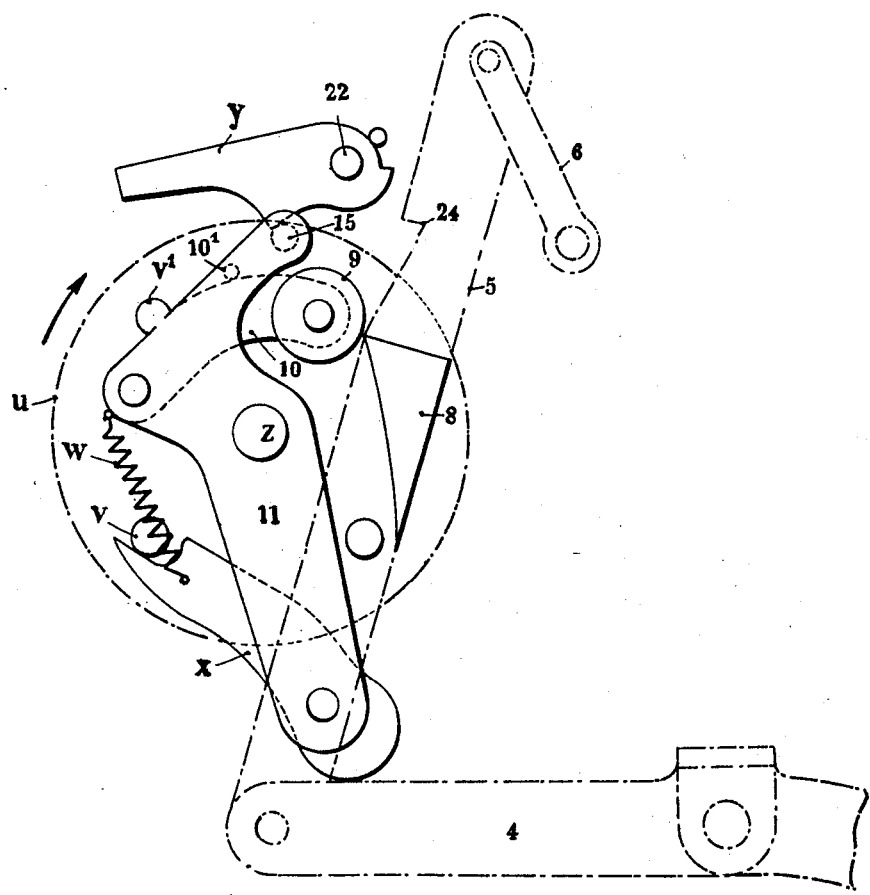

Figs. 6 and 6ª show an elevation of the apparatus with one side removed, and the whole at rest;

Figs. 7 and 7ª correspond to Figs. 6 and 6ª;

Fig. 8 shows in detail the mechanism that actuates the apparatus;

Figs. 9 and 10 show in detail the same mechanism when working;

Fig. 11 shows in detail the automatic locking device, at the time when only a single unit remains before it is actuated by the counter;

Fig. 12 shows the same device during locking.

Figure 3:
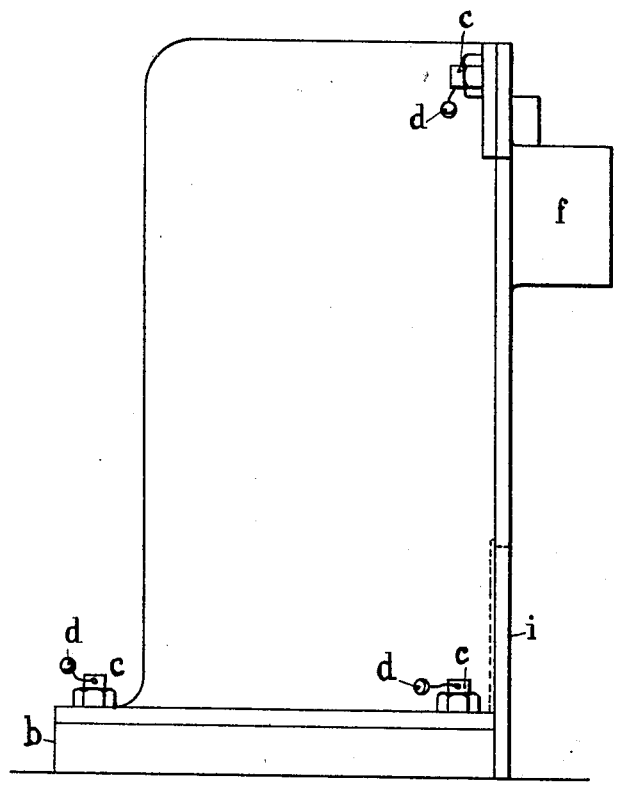
Fig. 3 is a side view.

As may be seen from this drawing, Figs. 1 to 3, this apparatus presents the appearance of a box $a$, fixed on to a base plate $b$ by means of bolts $c$, the nuts of which are rendered irremovable by means of leaden seals $d$.

Under a small window which may be a pane of glass $e$, Fig. 2, are seen the figures of a counter $f$ to which it is impossible to obtain access without breaking the seals.

An operating handle $g$ is arranged at the side of the apparatus, to be actuated downward.

The box is raised about a centimeter at the four corners, to enable the documents that are to be stamped to be passed into $h$.

A window $i$, closed by a pane, allows the place to which the stamp is to be applied to be seen.

The stamp or die $j$, Figs. 4 and 5, is actuated in a special manner, in order that it may effect a complete return stroke suddenly, each time the operating handle $g$ is actuated. With this end in view, this handle only acts to cock a spring and release it at the end of its stroke, and has no direct mechanical connection with the stamp or die. This condition is considered indispensable for the purpose of preventing fraud, for if this handle actuated the stamp or die directly it would be easy to substitute one sheet of paper for another by easing the stamp or die very slightly without allowing it to make a full enough stroke to actuate the counter. It is for the purpose of preventing this fraudulent operation that in the present invention the handle only has the effect of cocking a spring and releasing it. It is under the action of the spring so released that the stamp makes a complete return stroke, as will be seen further on.

In view of what has been said, it will be easy to understand the arrangement and control of the stamp or die $j$.

As shown, in Figs. 4 and 5, the stamp or die is virtually integral with a tube $k$ and with a frame $l$. The tube $k$ is guided on the guide rod $m$, which is fixed to the support $n$. The stamp so constituted is cushioned through the medium of a spring $o$ inclosed in a frame $p$, also guided on the fixed rod $m$. This frame $p$ carries two trunnions $p^1$, $p^2$ upon which are mounted two operating connecting rods $q$ actuated by two cranks $r$, keyed on to a shaft $s$, driven by a gear wheel $t$. The trunnion $p^2$ is prolonged in such a way as to be displaceable in a longitudinal slot $p^3$ formed in the frame-work in order to prevent the frame $p$ from rotating.

The mere inspection of Figs. 4 and 5 shows that in order to effect a stamping all that is necessary is to rotate the toothed wheel $t$ through one complete revolution. In point of fact the connecting rods $q$, in descending, carry along with them the frame $p$, which bears on the spring $o$, which transmits this pressure to the frame $l$. This frame $l$ in descending, carries along with it the stamp or die $j$, which is virtually integral with it, and presses on the paper. If the document to be stamped is very thick, the spring $o$ will be compressed to an extent equal to the thickness of such document. In this way it will be possible to stamp letters from the thickness of one sheet up to about one centimeter, and more, if the apparatus has been designed for the purpose.

This being presupposed, the problem is summed up in occasioning a rotation through one complete revolution of the toothed wheel $t$. To this end, this wheel is in gear with a second toothed wheel $u$, four times as large (see Figs. 6 and 7), so that a quarter of a revolution of the wheel $u$ causes a rotation of one complete revolution of the wheel $t$.

The toothed wheel $u$ is provided with four projections or nipples.

In the position of rest illustrated in Fig. 6 one nipple $v^1$ is engaged between the pawl $x$ and the counterpawl $y$. It is therefore kept stationary.

The toothed wheel $u$ is mounted loosely on the shaft $z$ but it is in gear with the toothed wheel $t$ and is virtually integral with a second wheel 1, which in turn drives a toothed wheel 2, which is keyed to the shaft 3 of the counter $f$.

The ratio between the numbers of teeth in the wheels 1 and 2 is such that when the wheel 1 makes a quarter of a revolution the wheel 2 only makes one-tenth of a revolution and this corresponds to one unit of the counter $f$.

As has been stated above, the problem consists in utilizing an operation of the handle $g$ for the purpose of bringing about a release, having the effect of determining a rotation of a quarter of a revolution of the wheel 1. With this end in view the handle $g$ is virtually integral with a lever 4, connected with a connecting rod 5, guided at the top by means of a link 6 capable of turning about a fixed pivot 7.

The connecting rod 5 carries a small piece of tempered steel 8, Figs. 7, 8, 9 and 10, triangular in shape, fixed on to it. This piece 8 acts on a roller 9, which, through the medium of a connecting rod 10, bearing on a projection $10^1$, carries along with it a piece 11, virtually integral with the shaft $z$ and carrying the pawl $x$.

Furthermore the shaft $z$ is urged in the direction of the arrow by a spiral spring 12 arranged in a cylinder 13, fixed on to the plate 14, Fig. 7.

A small finger 15, integral with the part 11, has to meet the counter-pawl $y$ and raise it in such a way as to enable the wheel $u$ to rotate in the direction of the arrow, as soon as the part 8 has left the roller 9.

The mounting is regulated in such a way that the roller 9, while carrying along with it the part 11, stresses the spring 12, until the pawl $x$ comes into engagement with one of the nipples $v$, (Fig. 9).

When the connecting rod 5, continuing to rise, Fig. 10, has released the roller 9, the part 11, which, as has been stated, is virtually integral with the shaft $z$ which is urged by the spring 12, is about to set itself in motion.

Fig. 10 illustrates, the mechanism as a whole, during this movement, at the moment when the counter-pawl $y$, having let the nipple $v^1$ pass, is about to be abandoned by the finger 15.

The nipple $v$, pushed by the pawl $x$, then comes and meets the counter-pawl $y$, which is brought back to rest by a spring 16.

The wheel $u$ having effected a quarter of a revolution, the wheel $t$ will have made a complete revolution, and, consequently, will have effected a stamping.

During this time, the wheel 2, (Fig. 6) will have effected one-tenth of a revolution and made the counter $f$ advance one unit, the toothed wheel 2 being keyed on to the shaft 3, which is virtually integral with the units drum of the counter $f$.

On the outer check of the drum representing the highest unit selected, a piece 17 (Figs. 7, 11 and 12) has been arranged, carrying a screw 18, projecting from this disk.

When the counter marks the highest number, viz: 9999 in the example, the screw 18 meets a small arm 19 mounted loose on the shaft 3.

This arm 19 carries a small roller 20, upon which there rests an arm 21, virtually integral with the shaft 22, urged by a spring in the direction of the arrow, Fig. 11.

On the shaft 22 is keyed a catch or hook 23, capable of coming into engagement with a notch 24 on the connecting rod 5.

An inking device consisting of an inking roller 25 is operated by a frame 26 and arms 27 connected with the lever 4. The inking roller 25 itself is inked by a fixed roller 28, capable of being actuated from the exterior by means of a milled knob.

The frame 26, being urged upward by the spring 29, moves at every operation over the stamp $j$ each time the handle $g$ is worked.

In this way it will be possible to arrange in the box a small passage enabling the roller 28 to be inked without dismounting the apparatus.

This apparatus operates in the following manner:

The latter being in a position of rest, as indicated in Figs. 6, 7 and 8, by moving the handle $g$ downward the connecting rod is raised, and this, through the medium of the part 8, bearing on the roller 9, brings about the rotation of the part 11 and of the shaft $z$, until the roller 9 is on the point of becoming disengaged, as illustrated in Fig. 9. At that moment the finger 15 has raised the counter-pawl $y$, with a view to allowing the nipple $v^1$, which it had previously stopped, to pass. At that moment, the pawl $x$ has come into engagement with the lower nipple $v$, under the action of the spring $w$. The handle $g$ continuing to descend, the connecting rod 5 comes into and occupies the position indicated by Fig. 10. At that moment the spiral spring 12, Fig. 7, acting on the shaft $z$, causes the part 11 to rotate in the direction of the arrow, (Fig. 10). The wheel $u$ is then driven through the medium of the nipple $v$, and the counter-pawl $y$ becomes released after allowing the nipple $v^1$ to pass. The movement continues on this way until the nipple $v$ strikes against the counter-pawl $y$. The wheel $u$ has therefore made, during this operation, a quarter of a revolution, which has occasioned a rotation of the wheel $t$ (Fig. 7) through one complete revolution, and consequently, a complete return stroke of the stamp $j$. During the same period of rotation, the wheel 2 has effected one-tenth of a revolution and has made the counter $f$ advance one unit. When the handle $g$ is set free it rises automatically under the action of a spring 30, pressing upon the link 6. During the down stroke of the part 5, the roller 9 has rolled along the inclined plane presented by the part 8, compressing its antagonistic spring $w$, so that under the action of the latter the roller 9 resumes the position illustrated in Fig. 8, when the handle $g$ is raised again.

The working continues in this way until the moment when the counter $f$ marks the highest number for which it has been set. At this moment, the screw 18, as shown in Fig. 11, comes into contact with the small arm 19, ready to actuate it. If it is desired to proceed then with a fresh stamping, the screw 18, in traversing the tenth of a revolution corresponding to the recording of this operation will carry along with it the small arm 19, which will have the effect of releasing the arm 21 and of bringing into action the catch or hook 23, which will prevent the connecting rod 5 from descending, and will consequently prevent the part 8 from coming and placing itself under the roller 9, which it will then no longer be able to drive. If, in this position, it is desired to put the apparatus in condition to furnish a fresh series of operations, it will be necessary, after unsealing the apparatus and exposing the counter, to withdraw the screw 18, Fig. 12, which will enable the locking device to be cocked afresh, that is to say, it will enable the small arm 19 to be brought back under the arm 21, as indicated by Fig. 11. When this has been done, the screw 18 will be put back into its place, and since it will be located to the left of the small arm 19, it will be able to describe the nine-tenths of the circumference without producing any motion.

The forms, details, accessories, materials and dimensions of this apparatus may of course be varied, without thereby affecting in any way the principle of the invention.

What we claim and desire to secure by Letters Patent of the United States is:—

1. A stamping and registering machine comprising a movable stamping device, a control spring connected with the stamping device, means for operating the stamping device and spring so that the stamping device is moved quickly backward and forward so that it cannot stop either during the said movements or in the stamping position, means for counting and registering the number of operations of the spring and stamp, and means for stopping the machine after the completion of a predetermined number of operations.

2. A stamping and registering machine comprising a movable stamping device, a control spring connected with the stamping device, means for operating the stamping device and spring so that the stamping device is moved quickly backward and forward so that it cannot stop either during the said movements or in the stamping position, means for counting and registering the number of operations of the spring and stamp, means for stopping the machine after the completion of a predetermined number of operations, a box for inclosing the machine and means for sealing the box.

3. A stamping and registering machine comprising a stamp, a rotary operating device for the stamp, a spring in connection with such rotary device, hand operated means for rotating the said device so as to tighten the spring, means connected with the operating means for releasing the rotary device to permit actuation of the stamping device by means of the said spring, a pinion operated from the said rotary device, a counting device operated by the said pinion, catch mechanism for preventing the operation of the rotary device, and means for controlling such catch mechanism so as to stop the operation of the machine after a predetermined number of stampings have been effected.

The foregoing specification signed by us this 23rd day of April, 1919.

PHILIPPE HENRI LOUIS TIRANTY.
JAMES TIBURCE FELIX CONTI.